(12) United States Patent
Ginart et al.

(10) Patent No.: US 11,575,332 B1
(45) Date of Patent: Feb. 7, 2023

(54) HIGH CURRENT VOLTAGE-SOURCE CONVERTER

(71) Applicant: Smart Wires Inc., Union City, CA (US)

(72) Inventors: Antonio Ginart, Santa Clarita, CA (US); Shreesha Adiga Manoor, Milpitas, CA (US); Govind Chavan, Union City, CA (US); Mahsa Ghapandar Kashani, Millbrae, CA (US); Haroon Inam, San Jose, CA (US)

(73) Assignee: Smart Wires Inc., Durham, NC (US)

( * ) Notice: Subject to any disclaimer, the term of this patent is extended or adjusted under 35 U.S.C. 154(b) by 0 days.

(21) Appl. No.: 17/446,928

(22) Filed: Sep. 3, 2021

Related U.S. Application Data

(60) Provisional application No. 63/198,111, filed on Sep. 29, 2020.

(51) Int. Cl.
*H02M 7/5387* (2007.01)
*H02M 7/493* (2007.01)

(52) U.S. Cl.
CPC ......... *H02M 7/5387* (2013.01); *H02M 7/493* (2013.01)

(58) Field of Classification Search
CPC ..................... H02M 7/493; H02M 7/5387
See application file for complete search history.

(56) References Cited

U.S. PATENT DOCUMENTS

| | | | |
|---|---|---|---|
| 8,755,206 B2 | 6/2014 | Nee | |
| 9,496,799 B2 | 11/2016 | Goetz et al. | |
| 9,502,960 B2 | 11/2016 | Weyh et al. | |
| 9,780,658 B2 | 10/2017 | Eckel et al. | |
| 10,263,506 B2 | 4/2019 | Brueckner et al. | |
| 2018/0141440 A1 | 5/2018 | Cartailler et al. | |
| 2021/0184594 A1* | 6/2021 | Shen | H02M 3/1584 |

* cited by examiner

*Primary Examiner* — Jue Zhang
(74) *Attorney, Agent, or Firm* — Womble Bond Dickinson (US) LLP

(57) ABSTRACT

A voltage source converter has a first inverter valve unit that has a first terminal and a second terminal, and a second inverter valve unit that has a first terminal and a second terminal. The first inverter valve unit and the second inverter valve unit are connectedly arranged in parallel. The first inverter valve unit and the second inverter valve unit are self-balancing through equal capacitance and parallel connection of the first inverter valve unit and the second valve unit.

20 Claims, 6 Drawing Sheets

HIGH CURRENT VOLTAGE-SOURCE CONVERTER

This application claims benefit of priority from U.S. Provisional Application No. 63/198,111, titled High Current Voltage Source Converter and filed Sep. 29, 2020, the disclosure of which is incorporated herein by reference.

TECHNICAL FIELD

The present disclosure relates to a high current Voltage-Source Converter (VSC) for high-voltage alternating current (HVAC) power transmission.

BACKGROUND

Modern electric power grids are widely interconnected. The need for these interconnections, apart from delivery, is to pool power generation plants and load centers to minimize generation capacity and energy costs. Power transmission and interconnection requirements include accommodating a diversity of loads and power sources reliably and with lower cost. Further, the advent of large-scale distributed systems such as photovoltaic (PV) panels, wind turbines, energy storage devices, and electric vehicles require high current transmission lines that operate in excess of a thousand of Amps current as well as functionality that changes in real time. These requirements create challenges for ensuring power safety, quality and reliability.

A smart grid differs from a traditional power grid such that they provide a system to interconnect different kinds of distributed power generation sources. Therein, increasing demands are being placed on the transmission network due to an increasing number of non-utility generators. It is also exceedingly difficult to acquire and deploy new rights-of-way. The increased demands on transmission, combined with a lack of long-term planning and a desire to provide open access to generating companies and customers create further issues such as reduced security and reduced quality of service.

A Flexible Alternating Current Transmission System (FACTS) provides control of one or more AC transmission parameters to enhance controllability and increase power transfer capability. FACTS improve transmission quality, efficiency, and reliability, as well as reduce power delivery costs of AC grids. They are widely accepted as an essential technology for implementing smart grids.

A single-phase, modular, Static Synchronous Series Compensator (SSSC) is an important component of FACTS. The SSSC injects a leading or lagging voltage into the AC transmission line, providing the functionality of a series capacitor or series reactor respectively, i.e. it pushes power away from or pulls more power towards the circuit on which it is installed. This capability is effective in highly meshed electric power grids where spare system capacity can be utilized to resolve overloads. Further, SSSC's can be installed on dedicated transmission towers within the transmission right-of-way or in banks inside or nearby existing substations. They are well-suited for mobile applications due to their compact and lightweight modularity and high MVAr output.

The SSSC comprises a voltage-source converter which operates in series with the AC transmission line. A VSC with gate-controlled switching elements acts as a DC to AC converter which exchanges active and reactive power with the AC system; it is used to generate and inject an AC voltage in series with the transmission line, and if the voltage is in phase quadrature with the transmission line current, it supplies or consumes variable reactive power. A VSC includes a plurality of gate-controlled switching elements and uses a DC capacitor as a current source. The unidirectional voltage of the DC capacitor is converted to an injected AC voltage through control of the switching elements. Further, the injected AC voltage is controlled in magnitude as well as its phase relationship to the AC system voltage. When the injected AC voltage is in phase quadrature with reference to the AC transmission current, leading or lagging, the VSC is used to absorb or supply reactive power. Since the VSC generates an AC voltage from a DC voltage it also referred to as an inverter, even though it has the capability to transfer power in either direction.

There are two commonly used VSC configurations: a Half-Bridge (HB) configuration and a Full H-bridge (FHB) configuration. The Half-Bridge (HB) configuration comprises a DC capacitor (C) and two switching elements. The two switching elements are driven by complementary signals and the corresponding (AC) voltage may be either equal to the DC capacitor voltage or zero. Alternatively, the Full H-bridge (FHB) configuration comprises a DC capacitor (C) and four switching elements. The generated voltage varies with the switching states of the switching elements. Compared with the HBM, there is at least one more capacitor ON state for the FHB such that the generated voltage is equal to the negative capacitor voltage (C) when two of the switching elements are switched ON. Another difference between the HBM and the FHBM is the energization state; the capacitor (C) voltage is inserted at the generated voltage of the FHB configuration regardless of the current direction. The circuitry requires bidirectionality since the DC voltage does not reverse, however the switching elements do not require having a reverse voltage capability since the direct current flows in two directions.

The VSC includes an inverter valve unit comprising a plurality of switching elements arranged in an FHB configuration. Examples of switching elements include but are not limited to, gate-controlled power semiconductor devices, insulated gate bipolar transistors (IGBTs), metal-oxide semiconductor field effect transistors (MOSFETs) or other similar devices. In the case of IGBTs, a diode referred to as a freewheeling diode is placed anti-parallel with the IGBT and conducts current in the opposite direction. The switching elements are connectedly arranged in series where each of the switching elements maintains a portion of the voltage applied to the inverter. A controller provides signals to drive the switching elements.

In one embodiment, IGBTs are the preferred semiconductor devices for the inverter valve unit. Their transistor characteristics require low drive power and they provide fast current turn-off capability. Progress in device and packaging materials allow for an increase in the power ratings and heat dissipation while reducing on-state and switching losses.

There is an ongoing need for improvements in the devices and systems described above.

SUMMARY

A voltage source converter and related method of operating a voltage source converter are herein described.

One embodiment of a voltage source converter has a first inverter valve unit and a second inverter valve unit. The first inverter valve unit includes a first terminal and a second terminal. The second inverter valve unit includes a first terminal and a second terminal. The first inverter valve unit and the second inverter valve unit are connectedly arranged in parallel. The first inverter valve unit and the second inverter valve unit are self-balancing through equal capacitance and parallel connection of the first inverter valve unit and the second inverter valve unit.

One embodiment of a voltage source converter includes a first inverter valve unit, a second inverter valve unit, and paralleling conductors. The first inverter valve unit includes a first capacitor, transistor switches, a first terminal and a second terminal. The second inverter valve unit includes a second capacitor, transistor switches, a first terminal and a second terminal. Paralleling conductors connect the first terminal of the first inverter valve unit to the first terminal of the second inverter valve unit, and connect the second terminal of the first inverter valve unit to the second terminal of the second inverter valve unit. The first inverter valve unit and the second inverter valve unit are self-balancing. The self-balancing is through the first capacitor and the second capacitor having equal capacitance. The self-balancing is further through the paralleling conductors providing parallel connection of the first inverter valve unit and the second inverter valve unit.

One embodiment is a method of operating a voltage source converter. The method includes producing a first AC current, using a first capacitor in a first inverter valve unit. The method includes producing a second AC current, using a second capacitor in a second inverter valve unit. The method includes summing the first AC current and the second AC current through a parallel connection of the first inverter valve unit and the second inverter valve unit, to produce a transmission line current. The first AC current and the second AC current are equal through self-balancing of the first inverter valve unit and the second inverter valve unit.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
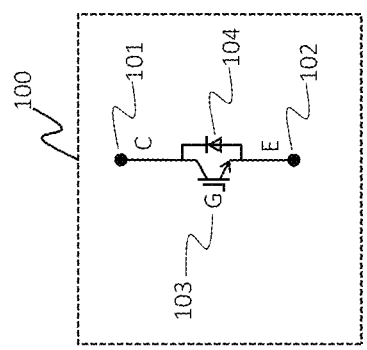
FIG. 1 illustrates an example switching element.

A high current Voltage-Source Converter (VSC) comprising a plurality of parallel connected inverter valve units is disclosed. The inverter valve unit comprises a plurality of switching elements arranged in a full H-bridge (FHB) configuration. More precisely, embodiments of the disclosure concern a self-balancing circuit and method for equalizing the voltage-source converter currents.

Compared to a single inverter valve unit, two or more inverter valve units connected in parallel increase the current capacity allowing the VSC to operate high transmission line currents exceeding a thousand of Amps. The output AC voltage is the same, however, the added parallel connected inverter valve unit allows added transmission line current to flow through the VSC. In an ideal VSC comprising two parallel connected inverter valve units, the plurality of series and parallel connected switching elements (e.g., IGBTs) have perfectly matched device characteristics (e.g. switching time), the control circuit drives each switching element at precisely identical times, the DC capacitance characteristics are identical and all device characteristics remain constant over time. In the ideal VSC with two parallel connected inverter valve units, the system performs as a balanced system—the currents for each of the two parallel inverter valve units are identical in magnitude and have conforming waveforms to the transmission line current.

Real-world applications are non-ideal. Device characteristics are not perfectly matched and components age unevenly. Hence the VSC's electrical characteristics invariably change over time. If the device characteristics of the parallel connected switching elements are not matched identically or the control circuitry drives the switching elements with differing time delays relative to the other switching elements or the DC capacitors are unequal. The VSC operates as an unbalanced system. In an unbalanced system, the currents for each of the two parallel inverter valve units are not identical in magnitude and nor have perfectly conforming waveforms to the transmission line current.

Unbalanced systems produce undesirable side-effects such as unwanted AC harmonics and excessive currents which may exceed the transmission line current by an order of magnitude or greater. The time duration of the excessive current in the order of milliseconds may vary depending in the extent of the imbalance. Excessive currents require higher component ratings which entails higher costs. Furthermore, excessive currents and the associated excessive heat can lead to the destruction of the switching elements and may also damage the drive unit and other system components. Finally, it is costly to match components at the point of manufacture as well as impractical to maintain constant performance characteristics over the operational lifetime of the VSC system. These factors restrict the use of parallel connected inverter valve units. To avoid such restrictions an active control system can be implemented to balance the power flow in real-time. The active control system dynamically adjusts the timing of the switching elements, circuit impedances and capacitances using an external controller. However, the active control system introduces other complications including increased component costs and reliability concerns. Hence there is a need for a self-balancing circuit for equalizing the currents for the parallel inverter valve units to operate high transmission line currents and simultaneously lowering component costs and improving the reliability of the VSC.

The present disclosure provides a series VSC to operate high transmission line currents (e.g., exceeding a thousand of Amps). The VSC comprises a plurality of inverter valve units connectedly arranged in parallel. The parallel connection combines the inverter valve AC currents such that the transmission line current equals the sum of the parallel connected inverter valve AC currents. A self-balancing circuit and method for the parallel connected inverter valve units balances the current flows in the VSC.

In accordance with the present disclosure a voltage-source converter comprises a first inverter valve unit and a second inverter valve unit connectedly arranged in parallel. The first inverter valve unit produces a first AC current, the second inverter valve unit produces a second AC current. The parallel connection of the first inverter valve unit and second inverter valve unit combine the first AC current and the second AC current such that the transmission line current equals the sum of the first AC current and the second AC current.

The inverter valve unit includes a plurality of switching elements, for example insulated gate bipolar transistors (IGBTs) arranged in two groups in an FHB configuration. The switching elements of the first inverter valve unit and the second inverter valve unit function by turning on and turning off by the gate control signal for each switching element. A controller provides a gate drive signal for each switching element.

A self-balancing circuit equalizes the current flows in the VSC. The self-balancing circuit equalizes the currents for first inverter valve unit and a second inverter valve unit thereby reducing unwanted AC harmonics and excessive currents within the VSC.

The self-balancing circuit comprising a plurality of paralleling conductors provides parallel connection of the first inverter valve unit and the second inverter valve. In one embodiment, the paralleling conductor comprises a low impedance paralleling conductor, wherein the impedance of the low impedance paralleling conductor is less than 10 ohms.

In a first aspect, the self-balancing circuit increases the transmission line current operation of the VSC. When all the switching elements are in function the first inverter valve unit produces a first AC current and the second inverter valve unit produces a second AC current such that the transmission line current equals the sum of the parallel connected first AC current and second AC current. The unidirectional voltage of the DC capacitor is converted to an injected AC voltage through sequential control of the switching elements. By way of control of the switching elements, it is possible to vary the injected AC output voltage in magnitude as well as the phase relationship to the AC system voltage. Therein the voltage-source converter injects an AC voltage in series with the line, and if the voltage is in phase quadrature with the transmission line current, the series VSC supplies or consumes variable reactive power.

In a second aspect, the self-balancing circuit comprising a first low impedance paralleling conductor and a second low impedance paralleling conductor produces a first AC current on the AC side of the first inverter valve unit equal to the second AC current on the AC side of the second inverter valve unit such that the current in the power inverter is balanced. As a result, excessive currents within the VSC and unwanted AC harmonics on the transmission line current and are reduced.

In a third aspect, the self-balancing circuit prevents excessive currents and the resulting damage to the switching elements and other system components since excessive currents can lead to the destruction and reduced reliability of the switching elements, capacitor break down and may also damage the drive circuit and other system components.

In a fourth aspect, the self-balancing circuit significant simplifies the control drive circuit and gate control signal for each switching element. Passive components and the associated circuitry are significantly less expensive to produce than an active control system functioning to balance the power flow in real time. As a result, the system cost is reduced, and the system reliability is increased since there are fewer components that can fail and/or damage to the power converter.

The present disclosure provides a voltage-source converter comprising a plurality of inverter valve units connectedly arranged in parallel. The parallel connection combines the inverter valve AC currents such that the transmission line current equals the sum of the parallel connected inverter valve AC currents. Compared to a single inverter valve unit, two or more inverter valve units connected in parallel serves to increase the transmission line current. A self-balancing circuit comprising a plurality of paralleling conductors provides parallel connection of the first inverter valve unit and the second inverter valve. The embodiments set forth below represent the necessary information to enable those skilled in the art to practice the invention and illustrate the best mode of practicing the invention.

FIG. 1 illustrates a block diagram of an example switching element in accordance with one embodiment. Switching element 100 (e.g., IGBT) includes a first connection 101 (e.g., collector), a second connection 102 (e.g., emitter) and a control connection 103 (e.g., gate). In the case of IGBTs, a freewheeling diode 104 is inserted anti-parallel with the IGBT.

Figure 2:
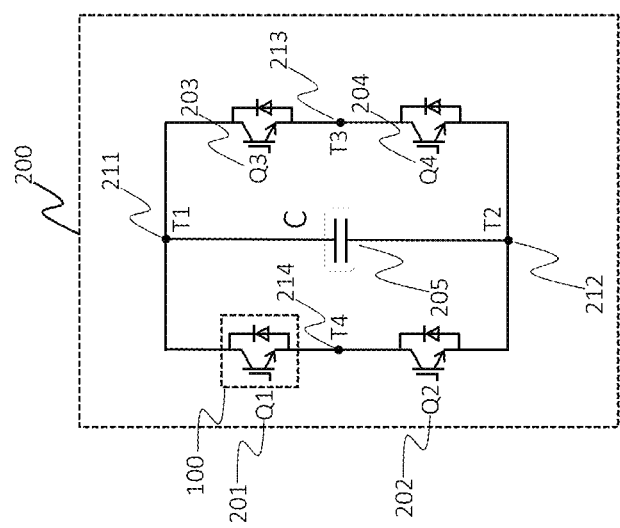
FIG. 2 illustrates an example inverter valve unit.

FIG. 2 illustrates a block diagram of an example inverter valve unit 200 in accordance with one embodiment. The inverter valve unit 200 may include a plurality of switching elements 100 arranged in a FHB configuration.

A Full H-bridge (FHB) configuration comprises of a DC capacitor 205 and four switching elements Q1 201, Q2 202, Q3 203 and Q4 204. The AC output voltage across T4 214 and T3 213 varies with the switching states of switching elements Q1 201, Q2 202, Q3 203 and Q4 204. In some embodiments, the semiconductor devices for the four switching elements 201-204 may be IGBTs. In the case of IGBTs, a freewheeling diode 104 is inserted anti-parallel with the IGBTs.

As shown, the switching elements 201-204 can be arranged in two groups. A first group of switching elements comprising Q1 201 and Q4 204 may be connected in parallel with the second group of switching elements Q3 203 and Q2 202. Conducting wires of the first group of switching elements Q1 201 and Q4 204 are arranged to pass a current in a first direction (C charging). Conducting wires of the second group of switching elements Q2 202 and Q3 203 are arranged to pass a current in a second direction (C charging), the second direction is opposite of the first direction. When the switching elements of the two groups of the parallel inverter valve units are in function the currents equal and the sum of the two groups equal the transmission line current.

The switching elements 100 of the first and second group are connected in series. The second connection 102 (e.g., emitter) of switch element Q1 201 is connected to the first connection (e.g., collector) 101 of switch element Q2 202. Similarly, the second connection 102 (e.g., emitter) of switch element Q3 203 is connected to the first connection (e.g., collector) 101 of switch element Q4 204.

The inverter valve unit 200 includes a first terminal (T1) 211 and a second terminal (T2) 212. A capacitor (C) 205 is connected across the first terminal 211 and a second terminal 212. The first terminal is connected to the positive side of the capacitor (C) 205, the second terminal is connected to the negative side of the capacitor (C) 205. A third terminal (T3) 213 is connected to the first group and second groups of switching elements, to the second connection (e.g., emitter) of switch element Q3 204, also connected to the first connection (e.g., collector) of switch element Q4 204. A fourth terminal (T4) 214 is connected the first group and second groups of switching elements, to the second connection (e.g., emitter) of switch element Q1 201, also connected to the first connection (e.g., collector) of switch element Q2 202.

Figure 3:
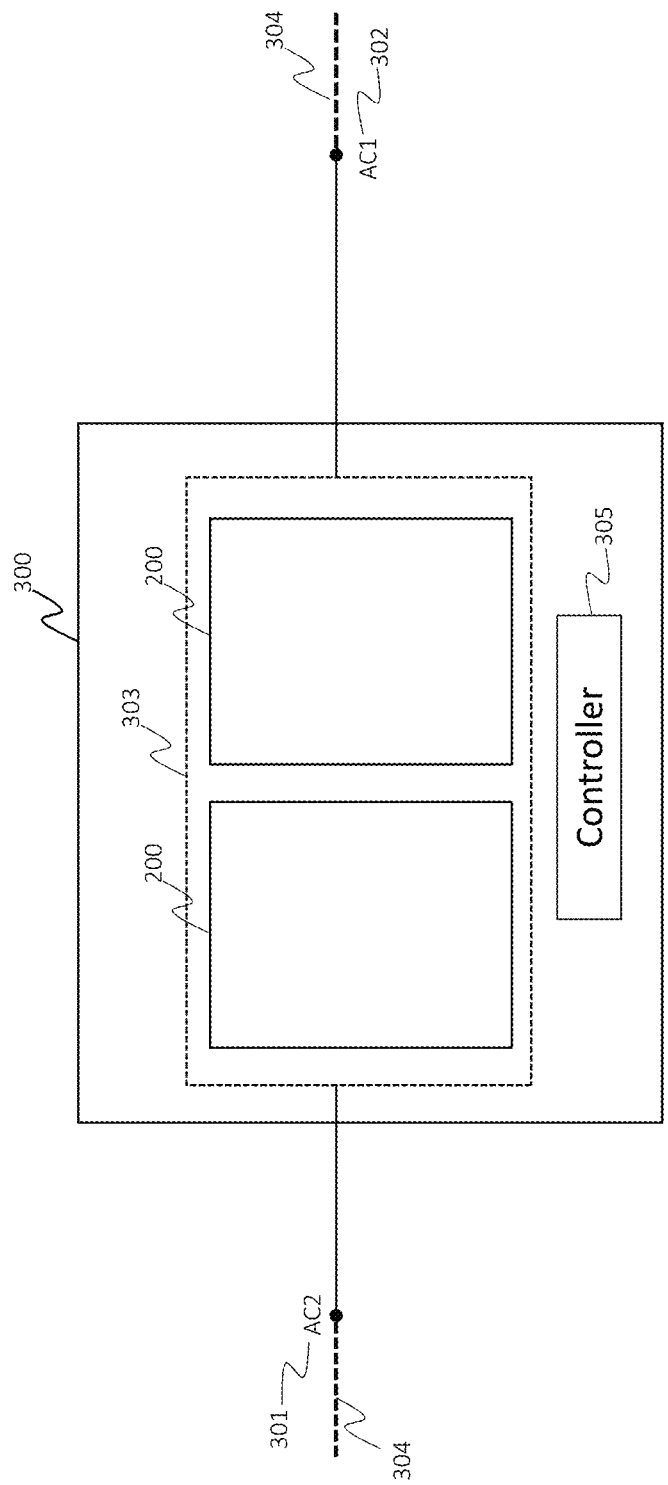
FIG. 3 illustrates a block diagram of an example static synchronous series compensator.

FIG. 3 illustrates a block diagram of an example SSSC in accordance with one embodiment. As shown, SSSC 300 comprises a Voltage-Source Converter (VSC) 303 which operates in series with the transmission line 304. The VSC 303 is series coupled to the transmission line via terminals AC1 301 and AC2 302. The transmission line current flows through terminals AC1 301 and AC2 302. The VSC 303 comprises a plurality of inverter valve units 200. A controller 305 provides control signal circuitry to drive the switching elements 100.

Figure 4:
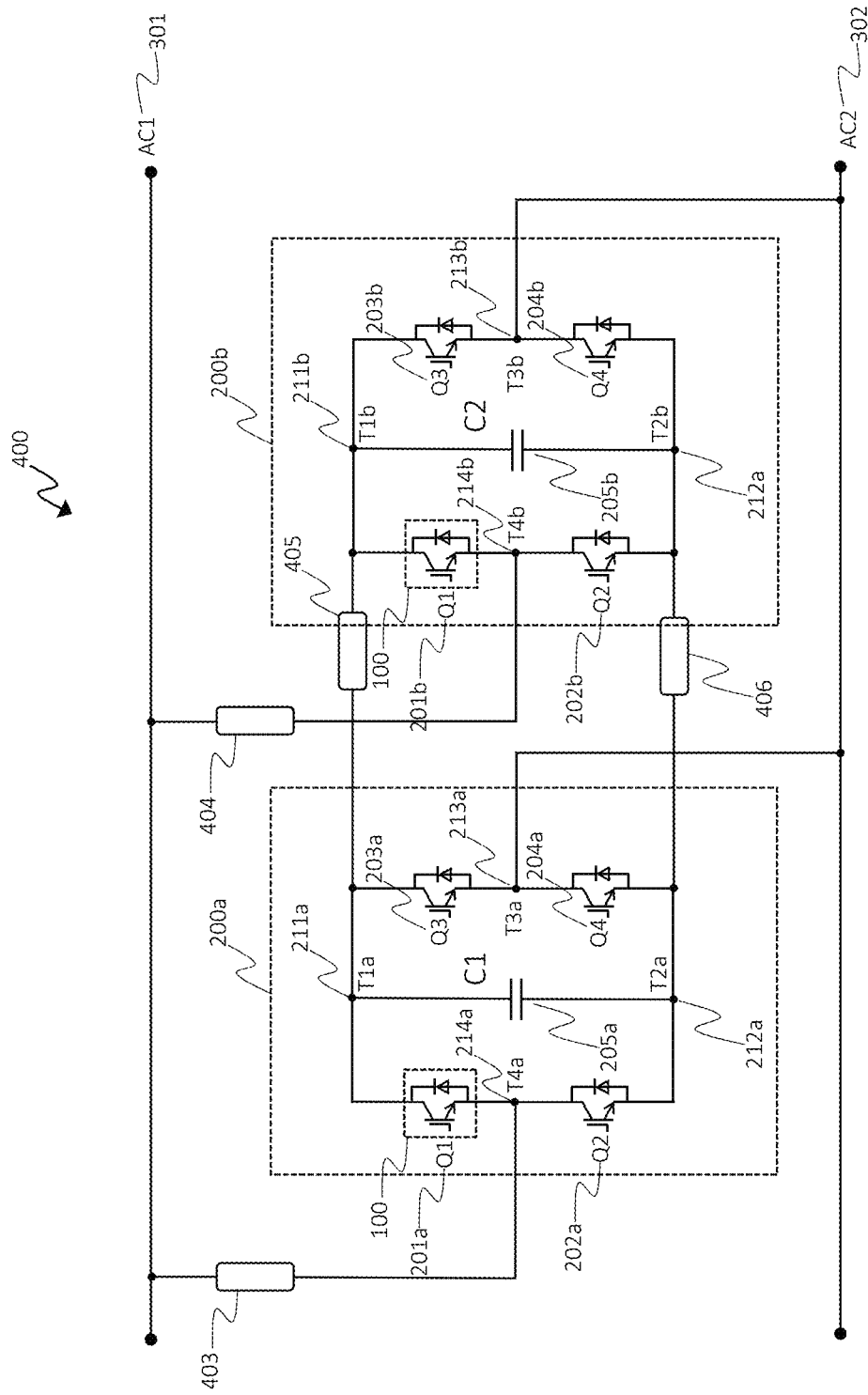
FIG. 4 illustrates a circuit diagram of an example voltage-source converter comprising two parallel inverter valve units.

A first embodiment of a VSC 400 is shown in FIG. 4. In the embodiment a first inverter valve unit 200*a* and a second inverter valve unit 200*b* are connectedly arranged in parallel. The first inverter valve unit 200*a* produces a first AC current, and the second inverter valve unit 200*b* produces a second AC current. The parallel connection of the first inverter valve unit 200*a* and second inverter valve unit 200*b* combine the first AC current and the second AC current such that the transmission line current flowing through terminals AC1 301 and AC2 302 equals the sum of the first AC current and the second AC current. The capacitors 205*a* and 205*b* have equal capacitance. In some embodiments, IGBT's 201*a*, 201*b*, 202*a*, 202*b*, 203*a*, 203*b*, 204*a* and 204*b* are same specification components, for example, Mitsubishi Electric CM1000DX(P)-24T.

A plurality of paralleling conductors 405 and 406 provides parallel connection of the first inverter valve unit 200*a* and the second inverter valve unit 200*b*. The paralleling conductors 405 and 406 comprise low impedance paralleling conductors. The impedance of the low impedance paralleling conductor is less than 10 ohms. A first paralleling conductor 405 connects the first terminal T1a 211*a* of the first inverter valve unit 200*a* to the first terminal of the second inverter valve unit T1b 211*b*. Similarly, a second paralleling conductor 406 connects the second terminal T2a 212*a* of the first inverter valve unit to the second terminal T2b 212*b* of the second inverter valve unit. The switching elements of the first inverter valve unit 201*a*, 202*a*, 203*a* and 204*a* and the second inverter valve unit 201*b*, 202*b*, 203*b* and 204*b* function by turning on and turning off by the gate control signal for each switching element 100.

A first DMC (differential mode choke) inductor 403 couples the first inverter valve unit 200*a* to the transmission line. The DMC inductor 403 is connected to the transmission line terminal AC1 301 and the first inverter valve unit fourth terminal T4a 214. A DMC inductor 404 is connected to the transmission line terminal AC1 301 and the second inverter valve unit fourth terminal T4b 214.

When all the switching elements are in function, the first inverter valve unit 200*a* produces a first AC current that flows between terminal T4a 214*a* and T3a 213*a*, and the second inverter valve unit 200*b* produces a second AC current that flows between terminal terminals T4b 214*b* and T3b 213*b*, such that the current flowing between the transmission line via terminals AC1 303 and AC2 304 equals the sum of the parallel connected first AC current and second AC current. The unidirectional voltages of the DC capacitors C1 205*a* and C2 205*b* are converted and presented across terminals T4a 214*a* and T3a 213*a*, and T4b 214*b* and T3b 213*b* as the injected AC voltage through sequential control of the IGBTs switching elements units 201*a*, 202*a*, 203*a*, 204*a* 201*b*, 202*b*, 203*b* and 204*b*.

Figure 5:
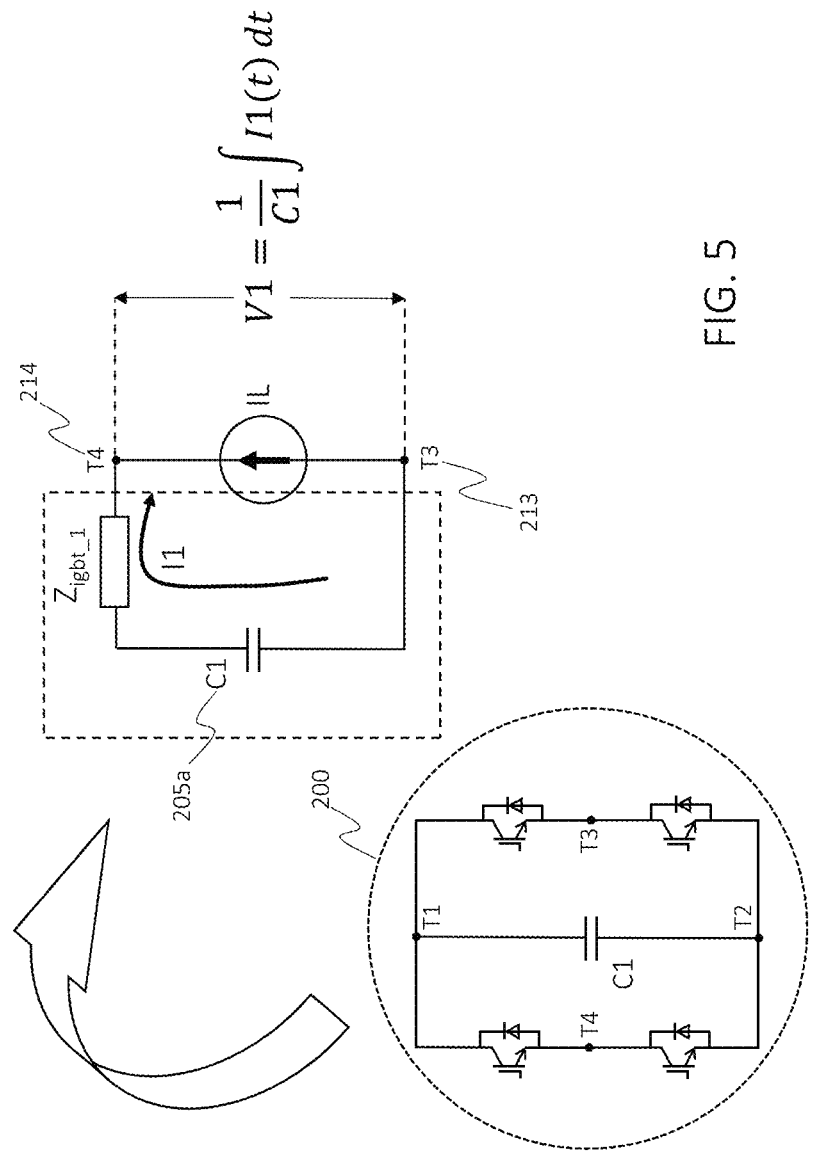
FIG. 5 illustrates an equivalent circuit of an inverter valve unit.

FIG. 5 illustrates an equivalent circuit of the inverter valve unit 200 and the following conditions are fulfilled:

$Z_{C_1} >> Z_{Igbt\_1}$,
$I_1(t) = I_L(t)$, $$V1 = \frac{1}{C1} \int I1(t)dt$$

where;
$Z_{C_1}$ is the equivalent impedance of C1 205*a*,
$Z_{Igbt\_1}$ is the equivalent impedance of switching elements 100,
$I_1(t)$ is the first AC current of the inverter valve unit 200,
$I_L(t)$ is the transmission line 304 current, and
V1 is the injected AC voltage of the of the inverter valve unit 200.

Figure 6:
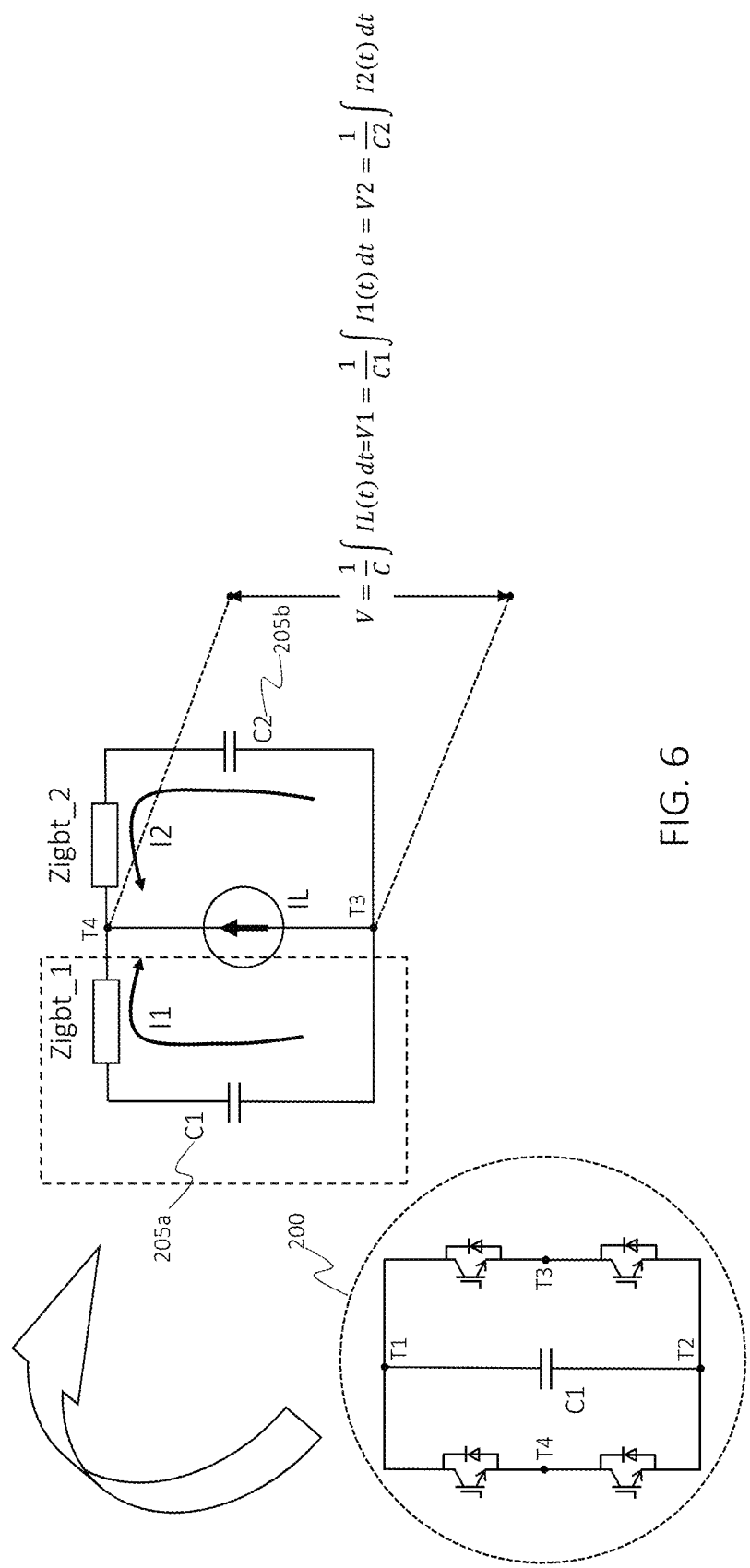
FIG. 6 illustrates an equivalent circuit of an example voltage-source converter comprising two parallel inverter valve units.

FIG. 6 illustrates an equivalent circuit a first inverter valve unit 200*a* and a second inverter valve unit 200*b* connectedly arranged in parallel. A plurality of low impedance paralleling conductors 405 and 406 provides parallel connection of the first inverter valve unit 200*a* and the second inverter valve unit 200*b*. If the capacitors C1 205*a* and C2 205*b* are equal, voltages and currents of the first inverter valve unit and a second inverter valve unit are equalized providing self-balancing.

The following conditions are fulfilled:
$Z_{C_1} \sim Z_{C_2} >> Z_{Igbt\_1}, Z_{Igbt\_2}$
$V1 = V2 = V$
(1) $I_1(t) + I_2(t) = I_L(t)$ $$V1 = \frac{1}{C1} \int I1(t)dt = V2 = \frac{1}{C2} \int I2(t)dt \qquad (2)$$

$$\frac{1}{C1} \int I1(t)dt = \frac{1}{C2} \int [IL(t) - I1(t)]dt$$

$$\frac{C1+C2}{C1} \int I1(t)dt = \int [IL(t)]dt$$

$$IL(t) = \frac{C1+C2}{C1} I1(t)dt$$

If C2~C1

$$I1(t) = \frac{1}{2} IL(t)dt$$

$$I2(t) = \frac{1}{2} IL(t)dt$$

where;

$Z_{C1}$ is the equivalent impedance of C1 205a, $Z_{C2}$ is the equivalent impedance of C2 205a, $Z_{Igbt\_1}$ is the IGBTs (switching element 100) equivalent impedance of the first inverter valve unit 200a, $Z_{Igbt\_2}$ is the IGBTs (switching element 100) equivalent impedance of the second inverter valve unit 200b, $I_1(t)$ is the first AC current of the first inverter valve unit 200a, $I_2(t)$ is the first AC current of the second inverter valve unit 200b, $I_L(t)$ is the transmission line 304 current, V1 is the injected AC voltage of the of the first inverter valve unit 200a

V2 is the injected AC voltage of the of the second inverter valve unit 200b, and V is the transmission line injected AC voltage.

In accordance with the present disclosure, the self-balancing circuit increases the transmission line 304 current $I_L(t)$ operation of the VSC 400. When all the switching elements are in function the first inverter valve unit 200a produces a first AC current $I_1(t)$ and the second inverter valve unit 200b produces a second AC current $I_2(t)$ such that the transmission line 304 current equals the sum of the parallel connected first AC current $I_1(t)$ and second AC current $I_2(t)$. By way of control of the switching elements 100, it is possible to vary the transmission line injected AC voltage (V) in magnitude as well as the phase relationship to the AC system voltage. The low impedance paralleling conductors 405 and 406 provide the parallel connection of the first inverter valve unit 200a and the second inverter valve unit 200b, such that V1=V2=V. Therein the VSC 400 injects an AC voltage (V) in series with the transmission line. If the injected AC voltage (V) is in phase quadrature with the transmission line current, the VSC supplies or consumes variable reactive power. The self-balancing circuit comprising a first paralleling conductor 405 and a second paralleling conductor 406 produces a first AC current $I_1(t)$ equal to the second AC current $I_2(t)$ such that the VSC 400 currents are balanced.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A voltage source converter, comprising:
    a first inverter valve unit including a first terminal, a second terminal, a third terminal, and a fourth terminal, the third terminal connecting two switches of the first inverter valve unit to each other and to a second transmission line terminal of the voltage source converter, the fourth terminal connecting two further switches of the first inverter valve unit to each other to couple to a first transmission line terminal of the voltage source converter; and
    a second inverter valve unit including a first terminal, a second terminal, a third terminal, and a fourth terminal, the third terminal connecting two switches of the second inverter valve unit to each other and to the second transmission line terminal of the voltage source converter, the fourth terminal connecting two further switches of the second inverter valve unit to each other to couple to the first transmission line terminal of the voltage source converter;
    wherein the first inverter valve unit and the second inverter valve unit are connectedly arranged in parallel; and
    wherein the first inverter valve unit and the second inverter valve unit are self-balancing through equal capacitance and parallel connection of the first inverter valve unit and the second inverter valve unit.

2. The voltage source converter of claim 1, further comprising:
    the first inverter valve unit comprising a first capacitor across the first and second terminals of the first inverter valve unit, and a first plurality of transistor switches as the two switches and the two further switches of the first inverter valve unit; and
    the second inverter valve unit comprising a second capacitor across the first and second terminals of the second inverter valve unit, and a second plurality of transistor switches as the two switches and the two further switches of the second inverter valve unit;
    wherein the first capacitor and the second capacitor have the equal capacitance.

3. The voltage source converter of claim 1, further comprising a plurality of paralleling conductors that provide the parallel connection of the first inverter valve unit and the second inverter valve unit, the plurality of paralleling conductors coupling the first terminal of the first inverter valve unit and the first terminal of the second inverter valve unit, and coupling the second terminal of the first inverter valve unit and the second terminal of the second valve inverter valve unit.

4. The voltage source converter of claim 1, further comprising a plurality of differential mode choke inductors, coupling the fourth terminal of the first inverter valve unit and the fourth terminal of the second inverter valve unit to the first transmission line terminal of the voltage source converter.

5. The voltage source converter of claim 1, further comprising:
    each of the first inverter valve unit and the second inverter valve unit including a plurality of transistors with each transistor having a freewheeling diode.

6. The voltage source converter of claim 1, wherein the first inverter valve unit and the second inverter valve unit are to produce equal AC currents that are summed, through the parallel connection, to produce a transmission line current.

7. The voltage source converter of claim 1, wherein each of the first inverter valve unit and the second inverter valve unit comprises a plurality of insulated gate bipolar transistors (IGBTs).

8. The voltage source converter of claim 1, where each of the first inverter valve unit and the second inverter valve unit comprises a full H bridge arrangement of four switches and one capacitor.

9. A voltage source converter, comprising:
    a first inverter valve unit comprising a first capacitor, a first plurality of transistor switches, a first terminal, a second terminal, a third terminal, and a fourth terminal, the first capacitor across the first and second terminals, the third terminal connecting two of the first plurality of transistor switches to each other and to a second transmission line terminal of the voltage source converter, the fourth terminal connecting a further two of the first plurality of transistor switches to each other to couple to a first transmission line terminal of the voltage source converter;

a second inverter valve unit comprising a second capacitor, a second plurality of transistor switches, a first terminal, a second terminal, a third terminal, and a fourth terminal, the second capacitor across the first and second terminals, the third terminal connecting two of the second plurality of transistor switches to each other and to the second transmission line terminal of the voltage source converter, the fourth terminal connecting a further two of the second plurality of transistor switches to each other to couple to the first transmission line terminal of the voltage source converter; and a plurality of paralleling conductors connecting the first terminal of the first inverter valve unit to the first terminal of the second inverter valve unit and connecting the second terminal of the first inverter valve unit to the second terminal of the second inverter valve unit;

wherein the first inverter valve unit and the second inverter valve unit are self-balancing through the first capacitor and the second capacitor having equal capacitance and through the plurality of paralleling conductors providing parallel connection of the first inverter valve unit and the second inverter valve unit.

10. The voltage source converter of claim 9, further comprising:
a plurality of differential mode choke inductors coupling the fourth terminal of the first inverter valve unit and the fourth terminal of the second inverter valve unit to the first transmission line terminal.

11. The voltage source converter of claim 9, wherein:
each of the first plurality of transistor switches includes a freewheeling diode; and
each of the second plurality of transistor switches includes a freewheeling diode.

12. The voltage source converter of claim 9, wherein:
the parallel connection of the first inverter valve unit and the second inverter valve unit is arranged to produce a transmission line current through summing a first AC current of the first inverter valve unit and a second AC current of the second inverter valve unit; and
the first AC current equals the second AC current.

13. The voltage source converter of claim 9, wherein each of the first plurality and second plurality of transistor switches comprises an insulated gate bipolar transistor (IGBT).

14. The voltage source converter of claim 9, wherein:
the first inverter valve unit comprises the first capacitor, and the first plurality of transistor switches as four transistors, in a first full H bridge arrangement; and
the second inverter valve unit comprises the second capacitor, and the second plurality of transistor switches as four transistors, in a second full H bridge arrangement.

15. A method of operating a voltage source converter, comprising:
producing a first AC (alternating current) current, using a first capacitor in a first inverter valve unit, the first inverter valve unit including a first terminal, a second terminal, a third terminal, and a fourth terminal, the first capacitor across the first and second terminals, the third terminal connecting two switches of the first inverter valve unit to each other and to a second transmission line terminal of the voltage source converter, the fourth terminal connecting two further switches of the first inverter valve unit to each other to couple to a first transmission line terminal of the voltage source converter;

producing a second AC current, using a second capacitor in a second inverter valve unit, the second inverter valve unit including a first terminal, a second terminal, a third terminal, and a fourth terminal, the first capacitor across the first and second terminals, the third terminal connecting two switches of the second inverter valve unit to each other and to the second transmission line terminal of the voltage source converter, the fourth terminal connecting two further switches of the second inverter valve unit to each other to couple to the first transmission line terminal of the voltage source converter; and summing the first AC current and the second AC current through a parallel connection of the first inverter valve unit and the second inverter valve unit, with the first AC current and the second AC current being equal through self-balancing of the first inverter valve unit and the second inverter valve unit, to produce a transmission line current.

16. The method of claim 15, wherein the self-balancing comprises the first capacitor and the second capacitor having equal capacitance.

17. The method of claim 15, wherein the summing the first AC current and the second AC current through the parallel connection comprises summing the first AC current and the second AC current through paralleling conductors coupling the first terminal of the first inverter valve unit and the first terminal of the second inverter valve unit, and coupling the second terminal of the first inverter valve unit and the second terminal of the second inverter valve unit.

18. The method of claim 15, further comprising:
supplying the transmission line current to transmission line terminals through differential mode choke inductors that couple the fourth terminal of the first inverter valve unit and the fourth terminal of the second inverter valve unit to the first transmission line terminal of the voltage source converter.

19. The method of claim 15, wherein:
the producing the first AC current using the first capacitor in the first inverter valve unit comprises producing the first AC current using the first capacitor and a first four switches in a first full H bridge arrangement; and
the producing the second AC current using the second capacitor in the second inverter valve unit comprises producing the second AC current using the second capacitor and a second four switches in a second full H bridge arrangement.

20. The method of claim 15, wherein:
the producing the first AC current comprises producing the first AC current through first insulated gate bipolar transistors (IGBTs) of the first inverter valve unit; and
the producing the second AC current comprises producing the second AC current through second insulated gate bipolar transistors (IGBTs) of the second inverter valve unit.

\* \* \* \* \*